United States Patent
Hay et al.

(10) Patent No.: US 8,037,193 B2
(45) Date of Patent: Oct. 11, 2011

(54) VIRTUAL TOKEN

(75) Inventors: Brian Robert Hay, Artarmon (AU); Timothy Winston Hibberd, Neutral Bay (AU); Ronald George Leenders, Stanmore (AU); Richard David Kinder, Stanhope Gardens (AU)

(73) Assignee: Telstra Corporation Limited (AU)

( * ) Notice: Subject to any disclaimer, the term of this patent is extended or adjusted under 35 U.S.C. 154(b) by 1218 days.

(21) Appl. No.: 10/169,279

(22) PCT Filed: Dec. 20, 2000

(86) PCT No.: PCT/AU00/01562
§ 371 (c)(1),
(2), (4) Date: Mar. 4, 2003

(87) PCT Pub. No.: WO01/48633
PCT Pub. Date: Jul. 5, 2001

(65) Prior Publication Data
US 2003/0163787 A1  Aug. 28, 2003

(30) Foreign Application Priority Data

Dec. 24, 1999 (AU) ........................ PQ4895
Jul. 5, 2000 (AU) ........................ PQ8664

(51) Int. Cl.
*G06F 15/16* (2006.01)
*G06F 21/00* (2006.01)
*H04L 9/32* (2006.01)

(52) U.S. Cl. ........ 709/229; 713/159; 713/172; 713/183; 713/185; 726/9; 726/20; 705/65; 705/66; 725/23; 709/227; 709/228

(58) Field of Classification Search .................. 709/228, 709/227, 229; 713/159, 172, 185, 183; 726/9, 726/20; 705/65, 66; 725/23; 194/205; 715/513, 715/514

See application file for complete search history.

(56) References Cited

U.S. PATENT DOCUMENTS 3,870,866 A * 3/1975 Halpern ................... 379/114.01
(Continued)

FOREIGN PATENT DOCUMENTS

EP  565314  10/1993
(Continued)

OTHER PUBLICATIONS

Research Disclosure 31921, Abstract, Nov. 1990.
(Continued)

*Primary Examiner* — John Follansbee
*Assistant Examiner* — Saket K Daftuar
(74) *Attorney, Agent, or Firm* — Knobbe Martens Olson & Bear LLP

(57) ABSTRACT

A virtual token represents an item, and includes embedded data defining rules and/or capabilities which apply to the use of the item. A virtual token may include graphical image data which is used to generate a display on a computer, whereby selection of the display allows the item represented by the virtual token to be used. A virtual token may contain instructions for sending access requests to a location on a communications network. A system for handling virtual tokens includes a clearing and routing house for routing token access requests, authenticating and generating tokens, and maintaining container structures for tokens. The system also includes connectors installed in a communications network for creating, controlling and managing items represented by tokens, and device clients for executing token components that issue access requests to the clearing and routing house.

14 Claims, 5 Drawing Sheets

U.S. PATENT DOCUMENTS

| | | | |
|---|---|---|---|
| 4,653,090 A | 3/1987 | Hayden | |
| 5,016,484 A | 5/1991 | Morikane | |
| 5,224,038 A * | 6/1993 | Bespalko | 715/234 |
| 5,287,447 A | 2/1994 | Miller et al. | |
| 5,341,293 A | 8/1994 | Vertelney et al. | |
| 5,379,366 A * | 1/1995 | Noyes | 706/55 |
| 5,414,841 A * | 5/1995 | Bingham et al. | 1/1 |
| 5,455,407 A | 10/1995 | Rosen | |
| 5,592,376 A | 1/1997 | Hodroff | |
| 5,627,978 A | 5/1997 | Altom et al. | |
| 5,634,019 A | 5/1997 | Koppolu et al. | |
| 5,687,323 A | 11/1997 | Hodroff | |
| 5,699,518 A | 12/1997 | Held et al. | |
| 5,710,886 A | 1/1998 | Christensen et al. | |
| 5,721,851 A | 2/1998 | Cline et al. | |
| 5,737,560 A | 4/1998 | Yohanan | |
| 5,740,549 A | 4/1998 | Reilly et al. | |
| 5,745,755 A * | 4/1998 | Covey | 707/203 |
| 5,770,533 A | 6/1998 | Franchi | |
| 5,781,189 A | 7/1998 | Holleran et al. | |
| 5,794,207 A | 8/1998 | Walker et al. | |
| 5,802,497 A | 9/1998 | Manasse | |
| 5,812,668 A * | 9/1998 | Weber | 705/79 |
| 5,813,019 A * | 9/1998 | Van De Vanter | 715/512 |
| 5,815,153 A | 9/1998 | Isensee et al. | |
| 5,815,657 A | 9/1998 | Williams et al. | |
| 5,839,119 A | 11/1998 | Krsul et al. | |
| 5,841,970 A * | 11/1998 | Tabuki | 726/2 |
| 5,850,442 A | 12/1998 | Muftic | |
| 5,862,339 A | 1/1999 | Bonnaure et al. | |
| 5,878,138 A | 3/1999 | Yacobi | 380/24 |
| 5,878,406 A * | 3/1999 | Noyes | 706/55 |
| 5,884,029 A | 3/1999 | Brush, II et al. | |
| 5,892,900 A | 4/1999 | Ginter et al. | |
| 5,910,987 A | 6/1999 | Ginter et al. | |
| 5,915,019 A | 6/1999 | Ginter et al. | |
| 5,915,093 A | 6/1999 | Berlin et al. | 395/200.49 |
| 5,917,912 A | 6/1999 | Ginter et al. | |
| 5,920,861 A | 7/1999 | Hall et al. | |
| 5,931,917 A * | 8/1999 | Nguyen et al. | 709/250 |
| 5,940,078 A | 8/1999 | Nagarajayya et al. | |
| 5,940,488 A | 8/1999 | DeGrazia et al. | |
| 5,943,422 A | 8/1999 | Van Wie et al. | |
| 5,943,423 A * | 8/1999 | Muftic | 705/67 |
| 5,958,005 A | 9/1999 | Thorne et al. | |
| 5,963,924 A | 10/1999 | Williams et al. | |
| 5,973,692 A | 10/1999 | Knowlton et al. | |
| 5,982,891 A | 11/1999 | Ginter et al. | |
| 5,983,234 A | 11/1999 | Tietjen et al. | |
| 5,984,512 A * | 11/1999 | Jones et al. | 709/219 |
| 5,986,654 A | 11/1999 | Alexander et al. | |
| 5,987,440 A | 11/1999 | O'Neil et al. | 705/44 |
| 6,006,194 A * | 12/1999 | Merel | 705/8 |
| 6,016,484 A | 1/2000 | Williams et al. | |
| 6,018,346 A | 1/2000 | Moran et al. | |
| 6,018,571 A | 1/2000 | Langlois et al. | |
| 6,035,280 A | 3/2000 | Christensen | |
| 6,035,287 A | 3/2000 | Stallaert et al. | |
| 6,041,309 A | 3/2000 | Laor | 705/14 |
| 6,041,357 A * | 3/2000 | Kunzelman et al. | 709/228 |
| 6,047,054 A | 4/2000 | Bayless et al. | |
| 6,052,486 A | 4/2000 | Knowlton et al. | |
| 6,052,780 A | 4/2000 | Glover | |
| 6,055,513 A | 4/2000 | Katz et al. | |
| 6,057,842 A | 5/2000 | Knowlton et al. | |
| 6,058,379 A | 5/2000 | Odom et al. | |
| 6,061,057 A | 5/2000 | Knowlton et al. | |
| 6,061,660 A | 5/2000 | Eggleston et al. | |
| 6,084,951 A | 7/2000 | Smith et al. | |
| 6,085,233 A | 7/2000 | Jeffrey et al. | |
| 6,112,181 A | 8/2000 | Shear et al. | |
| 6,119,101 A | 9/2000 | Peckover | |
| 6,119,112 A | 9/2000 | Bunnell | |
| 6,119,122 A | 9/2000 | Bunnell | |
| 6,119,229 A | 9/2000 | Martinez et al. | |
| 6,138,119 A | 10/2000 | Hall et al. | |
| 6,141,006 A | 10/2000 | Knowlton et al. | |
| 6,141,743 A * | 10/2000 | Strongin | 712/33 |
| 6,146,027 A | 11/2000 | Orton et al. | |
| 6,212,635 B1 * | 4/2001 | Reardon | 713/165 |
| 6,236,981 B1 * | 5/2001 | Hill | 705/67 |
| 6,240,094 B1 * | 5/2001 | Schneider | 370/412 |
| 6,282,522 B1 * | 8/2001 | Davis et al. | 705/41 |
| 6,308,270 B1 * | 10/2001 | Guthery | 726/9 |
| 6,329,994 B1 | 12/2001 | Gever et al. | |
| 6,349,290 B1 * | 2/2002 | Horowitz et al. | 705/35 |
| 6,360,215 B1 | 3/2002 | Judd et al. | 707/3 |
| 6,367,016 B1 * | 4/2002 | Lambert et al. | 713/185 |
| 6,385,729 B1 * | 5/2002 | DiGiorgio et al. | 726/9 |
| 6,418,420 B1 * | 7/2002 | DiGiorgio et al. | 705/40 |
| 6,446,052 B1 * | 9/2002 | Juels | 705/69 |
| 6,557,032 B1 * | 4/2003 | Jones et al. | 709/220 |
| 6,681,380 B1 * | 1/2004 | Britton et al. | 717/115 |
| 6,799,246 B1 * | 9/2004 | Wise et al. | 711/117 |
| 6,880,155 B2 * | 4/2005 | Schwabe et al. | 717/162 |
| 6,938,080 B1 * | 8/2005 | Kahveci et al. | 709/223 |
| 6,963,845 B1 * | 11/2005 | Lapstun et al. | 705/1.1 |
| 7,076,669 B2 * | 7/2006 | Poisner et al. | 726/22 |
| 7,096,210 B1 * | 8/2006 | Kramer et al. | 706/45 |
| 7,103,771 B2 * | 9/2006 | Grawrock | 713/155 |
| 7,111,094 B1 * | 9/2006 | Liu et al. | 710/65 |
| 7,177,838 B1 * | 2/2007 | Ling | 705/41 |
| 7,376,621 B1 * | 5/2008 | Ling | 705/41 |
| 2001/0027527 A1 * | 10/2001 | Khidekel et al. | 713/201 |
| 2002/0012443 A1 * | 1/2002 | Rhoads et al. | 382/100 |
| 2003/0069828 A1 * | 4/2003 | Blazey et al. | 705/37 |
| 2003/0088806 A1 * | 5/2003 | Dahlen et al. | 714/6 |
| 2003/0105810 A1 * | 6/2003 | McCrory et al. | 709/203 |
| 2009/0100149 A1 * | 4/2009 | Arnold et al. | 709/219 |

FOREIGN PATENT DOCUMENTS

| | | |
|---|---|---|
| EP | 0 887 756 A2 | 12/1998 |
| EP | 887756 | 12/1998 |
| WO | WO 98/32066 | 7/1998 |
| WO | WO 98/48555 | 10/1998 |

OTHER PUBLICATIONS

"XML, A door to Automated Web Applications", Khare et al, IEEE Internet Computing, Jul.-Aug. 1997, vol. 1, Issue 4, pp. 78-87.

"Calling Card Interface for Visual Telephony", IBM Technical Disclosure Bulletin, vol. 35, No. 4B, Sep. 1, 1992, pp. 291-293.

Research Disclosure (Anonymously disclosed) "Specifiable Logically Organized Views in a Desktop Environment". Nov. 1990.

* cited by examiner

VIRTUAL TOKEN

FIELD OF THE INVENTION

The present invention relates to a virtual token and to methods and systems for providing and using virtual tokens.

BACKGROUND OF THE INVENTION

Electronic commerce is touted as being the basis on which the majority of all transactions will be conducted in the future. For it to be accepted and utilised requires a change in traditional concepts associated with value, how it relates to assets or services, and in particular how that value is traded.

Traditionally the value of a telephone, calculator, software package or music album was quantifiable in terms of units of currency. Yet, in today's economy mobile phones are given away with the service, calculators are given away with magazine subscriptions, Internet browsers are free, and music can be copied and distributed freely by average citizens. Each still holds value for the bearer, but in a form that is getting more difficult to quantify in the form of currency units. As basic assets and services become commoditised (especially digital assets or services) and economic value shifts towards personalised packages of assets and services, the value of a given offering will differ by content, individual, time, and circumstance. Electronic money, barter tokens, e-wallets, online auctions, and online trading initiatives are currency-centric and do not address this issue.

Currency (in all its forms: money, credit cards, debit cards, pre-paid tokens, etc) is not likely to disappear as a convenient form of exchange. Its greatest strength, however, is also its greatest weakness. It can be exchanged for anything and it can be "laundered" or swapped for alternate currency units. For this reason, there will continue to be attempts to steal it. Security will continue to be improved and it will just as quickly be cracked. Unless each atomic currency unit is continuously tracked it can be quickly "laundered" and rendered untraceable and unrecoverable in an International network. One approach to circumventing this issue would be to provide an alternative that is less atomic and more traceable. Barter solutions have been proposed, but have not offered a sufficiently compelling alternative to currency-based systems to convince people to switch. Facilitating an exact match in an exchange of goods and services is complex and the issue is typically resolved by introducing barter units which are typically not tracked at an atomic level, so no currency issues are resolved. Most transaction-centric systems are prone to this effect.

The Internet has also given rise to a new paradigm for the manner in which assets or services can be distributed. Yet, despite the possibilities provided by the communications infrastructure of the Internet, information and content delivery is still primarily message based and addresses to locations, such as HTTP and e-mail addresses, are provided to identify where requests for the information can be made. This limitation also exists in other communications networks, such as mobile telecommunications networks, where again requests need to be made to an interactive voice response system or a messaging server, such as an SMS server, to obtain information. This limited approach is also adopted when seeking to direct potential customers or clients to a product or service. Messages are sent with address locations, or the address locations are advertised in traditional media, such as on television or on billboards. These approaches all require a person to use the address in the normal manner to access content or information. No additional value is provided with the address.

New business initiatives continue to replicate comfortable strategies. Targeted email (targeted mail), banner ads (physical ads), Multimedia Contact Centres (Call Centres), eCommerce Web sites (physical storefront), account aggregation sites (brokers), and portals (shopping malls) deliver an online commercial experience remarkably similar to a traditional commercial experience in the physical world. Innovations continue to promote a currency and transaction-centric, rather than results-centric, view of economic activity and value.

New technical initiatives have emerged based on the science of object-oriented (OO) design to propose systems that leverage the advantages of mirroring the real world. They are novel and provide some new benefits, however, they are still typically used to support the same comfortable strategies as those provided using other system architectures. Object-oriented proposals involve objects that have a life span, are self-describing and contain a representative image as these are usually fundamental aspects of object-oriented design in a visual world. There are systems that focus on encapsulating a transaction and others that focus on encapsulating real world objects such as ownership or digital asset management systems. The transaction-based systems typically involve disposable objects and do not support the business trend towards persistent relationships and the increased value of the ongoing support for the asset or service involved in the transaction. Transactions are a means to an end whereas the value is in the result. Ownership and digital asset management systems typically exclude transaction support, or are non-interactive, or do not support the object inter-relationships required by modem business relationships. To meet the needs of modem business relationships, a system is required that can: create, deliver and support a mechanism to represent a package of contextually related assets and services; reflect the influence of the involved parties; be secure and interactive; and combine the benefits of persistent elements and elements with a limited life span. The system should be simple to manage and scalable.

It is desired to address the above, or at least provide a useful alternative.

SUMMARY OF CERTAIN INVENTIVE ASPECTS

In accordance with the present invention there is provided a token representative of an item, and including embedded data defining rules and/or capabilities which apply to use of the item, such that said token has a value.

The present invention also provides a method of providing a virtual token, including:

generating a virtual token representative of an item, said token including identifying data, rules defining use of the item, and data defining operation and presentation of said token; and delivering said token for use by a person, such that said presentation is generated on said device;

wherein said person is able to use said item by selecting said presentation using said device.

The present invention also provides a virtual token representative of an item and having identifying data, instructions to send an access request to a location of a communications network and graphical image data to generate a display of a presentation of said token.

The present invention also provides a method of using a virtual token, including:

selecting a presentation of a virtual token, said token being representative of an item and including identifying data, rules defining use of the item, data to send an access request to a location of a communications network, and data defining operation and said presentation; and executing said data in response to selecting said presentation and sending said identifying data to said location with said access request.

The present invention also provides a system having components for generating and processing the token.

The present invention also provides a system having components for executing the steps of any one of the methods.

The present invention also provides software having components for generating and processing the token.

The present invention also provides software having components for executing the steps of any one of the methods.

The present invention also provides a token system for handling virtual tokens, including:

a clearing and routing house for routing token access requests, authenticating tokens and generating tokens, and maintaining container structures for said tokens;

connectors installed in a communications network for creating, controlling and managing items represented by said token; and device clients installed on devices for executing components of said tokens that issue access requests to said clearing and routing house.

BRIEF DESCRIPTION OF THE DRAWINGS

Preferred embodiments of the present invention are hereinafter described, by way of example only, with reference to the accompanying drawings, wherein.

DETAILED DESCRIPTION OF CERTAIN INVENTIVE EMBODIMENTS

Apparatus and methods for facilitating a results-centric approach to economic activity and value are described below. The approach uses virtual tokens and a system for creating, updating, and managing virtual tokens where a virtual token is representative of an item of perceived value, such as an asset or service or potential asset and service, and includes embedded data defining rules and/or capabilities which apply to the use of the item. Due to its enhanced characteristics and capabilities a virtual token is expected to have a higher perceived value than the referenced item.

Unlike systems that create a digital representation of physical or digital items or transactions to obtain physical or digital items, a virtual token (VT) is an extension of the physical or digital item into the virtual or digital world. Being a token, it is representative of the item and contains an item descriptor and potentially a link to the item if that facility is available, as described below with reference to FIG. 8. The VT can represent its referenced item when resolving its interdependency with other VTs. A VT does not contain embedded value (such as electronic currency units), it does not encapsulate a digital item (such as a digital recording of a song) and it does not limit itself to tracking or representing a digital or physical item. If the item is active or sentient, the VT links to it. VTs are not emissaries, as are mobile intelligent agents, and their programmability is not open-ended. Operational rules allow the virtual token to interact with a control system of an item and/or an item agent. An item agent is a system or party that acts on behalf of an item. For instance, the item agent may be an item creation or management system. Dependency rules allow multiple VTs representing perceived value to be clustered to create a VT of higher perceived value.

Figure 8:
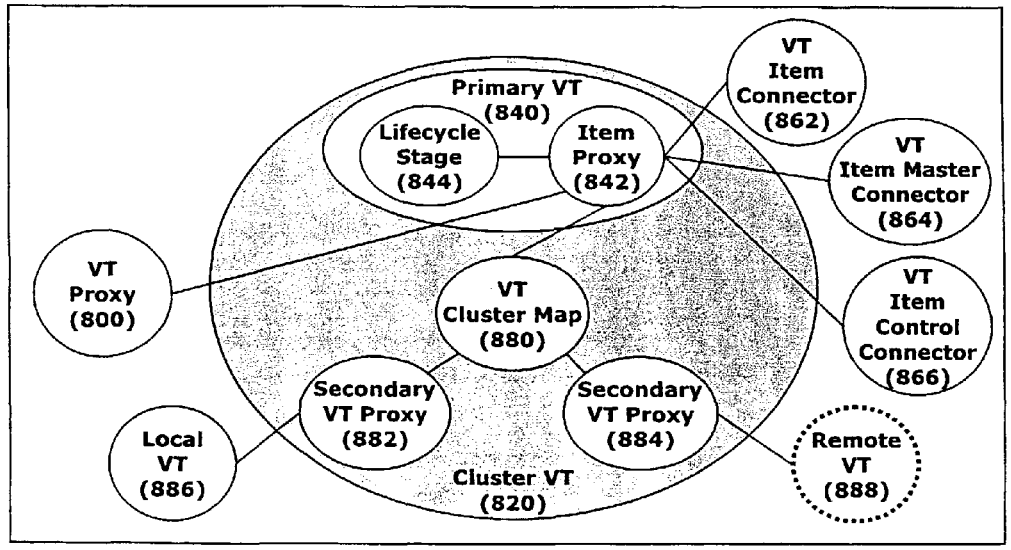
FIG. 8 is a diagram of an object model of components of a virtual token.

There are two categories of virtual token, as illustrated in FIG. 8, Simple VTs and Cluster VTs. A Simple VT involves a single item, such as an airline flight ticket, while a Cluster VT involves multiple items, such as a travel relationship involving multiple secondary VTs associated with travel items such as a booked rental car or flight upgrade voucher. A Simple VT with no superiors is referred to as a Primary VT while a Simple VT with one or more superiors is referred to as a Secondary VT. Primary VTs are generally persistent and reflect an on going relationship. Secondary VTs are usually disposable (one-shot or limited life span). Either type may be persistent or disposable. All VTs have a specified life span and VT-specific capabilities. Item-specific capabilities (such as "book a flight") associated with a VT are specified by a Life Cycle Stage as described in a Life-Cycle Program (LCP). A Life Cycle Program is a container structure for all the Life Cycle Stages that apply to a specific VT type and is embodied in a template used to create the VT. A VT may be switched from one Life Cycle Program to another if it was not restricted at creation time. A VT moves from one Life Cycle Stage to another based on the results of a capability invocation, events from the user, events from the item or item agent control system, or timed events set by the participants. Individuals specified in the owner list can modify VT data elements as permitted. Access to a VT can be specified in a token-specific access list.

Figure 5:
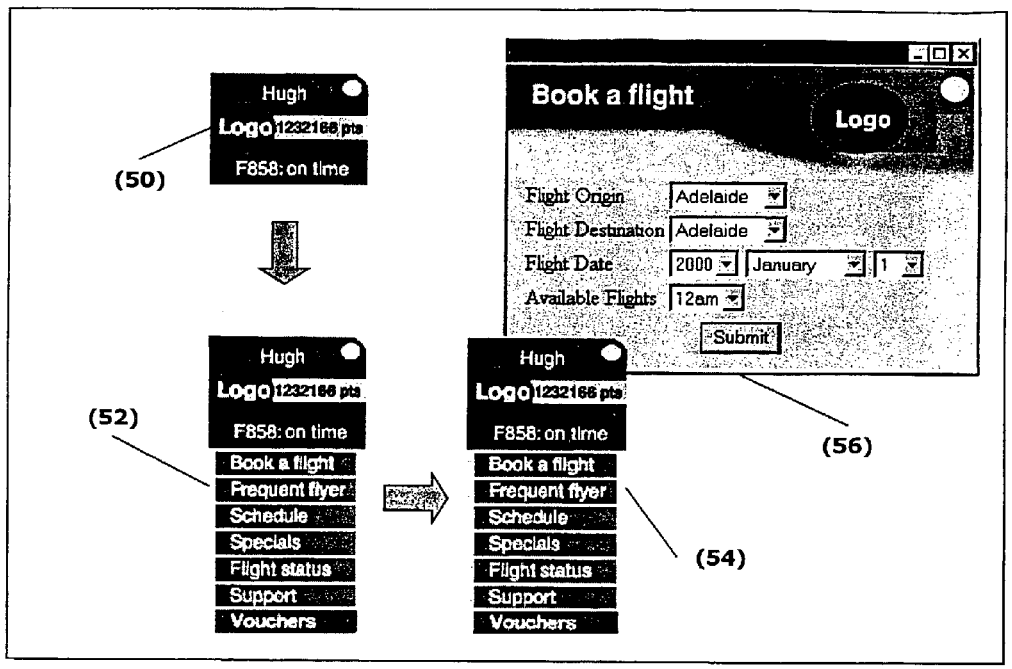
FIG. 5 is a diagram of user views of a virtual token.

FIG. 5 illustrates an example of a "Relationship" VT between an individual named Hugh and an airline. The VT provides instant access to business capabilities relevant to Hugh and, when online, up-to-date key status values. If a Device-Resident VT proxy is used to access the VT the last snapshot of key status values will remain displayed in the VT proxy Icon/display until the device, on which the proxy resides, is reconnected to the network, at which time it will be updated. The VT proxy generates a compressed proxy icon 50 that can be expanded to an expanded icon 52 showing additional details. The VT can then be placed online to generate an updated icon 54 and which may also trigger the generation of a pop up window 56. If desired, the compressed icon can also be placed online. Hugh can access his VT by entering its unique address on any network-connected device equipped with a network client application, such as a web browser. Access also requires completing the authentication sequence to interface to the VT system connected to the network using an On-Demand VT Proxy returned by the VT system to the network client. The VT reflects characteristics of all parties who have a vested interest, eg Hugh and the airline, as permitted by the token owner(s), eg the airline. When a business capability is triggered, a small window may pop up if the capability requires user input. The VT is then considered to be In-Session (this is a business rather than a technical concept)

until either party terminates the session or the session times out. The content of the popup window is described, and the delivery controlled, by the item or item agent. In this example of a Cluster VT, secondary VTs can be listed by triggering the "Vouchers" capability. An example of a VT representing a voucher could be a flight upgrade to a higher class of service and its dependency rules may indicate it only relates to other secondary VTs that represent a booked full-fare flight ticket.

The virtual token system architecture is secure, as the VT resides in a secure server cluster, as described below with reference to FIG. 9, and is only accessible using its unique network address and a secure Device-Resident or On-Demand access proxy. Any access to the VT also requires an authentication check. The VT system can be accessed using any security strategy including those requiring physical verification on the part of the accessing party. Since the VT does not include embedded value but represents an item of perceived value, it acts as a bastion to items or systems that contain items of real or perceived value. VTs do not operate relative to the item offline other than some local functions such as the display of the last status snapshot. Device-Resident VT Proxies can be distributed offline but they contain no value or secrets that makes them worth cracking, and are primarily a convenience element.

The virtual token system is scalable. The VT router/cache strategy, described with reference to FIG. 9 allows large numbers of offline VT proxies to establish online connectivity from any location in the world at the same time and reflect up-to-date status.

Figure 6:
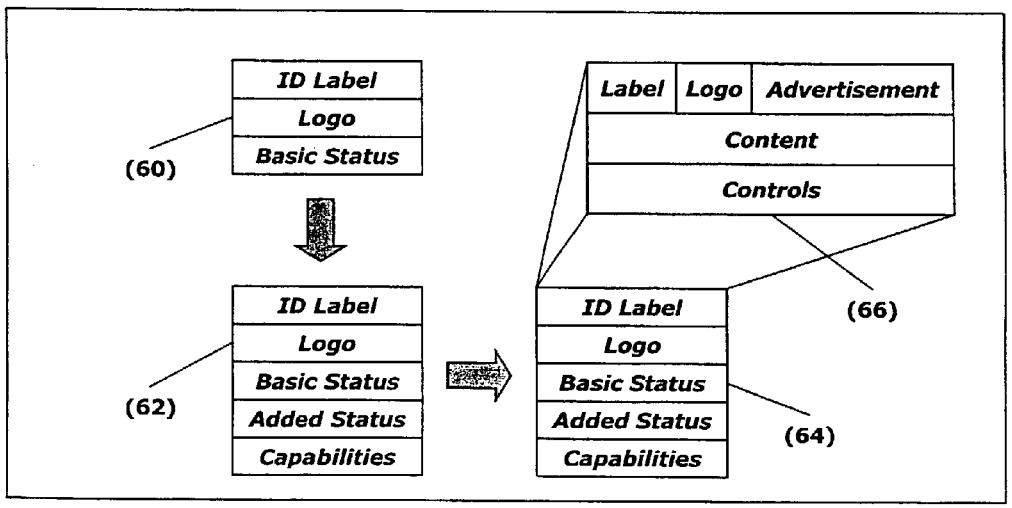
FIG. 6 is a diagram of components of a virtual token interface.

The virtual token interface is simple and consistent. As illustrated in FIG. 6, the virtual token is presented using a constrained footprint strategy that enables consistency across multiple device types using a variety of display sizes. The constrained footprint 60 of the VT Proxy generates a display which simply represents an identification label, a logo and some basic status information. This can be expanded to the expanded footprint 62 to also generate a display of additional status information and capabilities associated with the VT. The same components of the interface are generated for an online interface 64 when the VT Proxy is connected to the network which may involve the display of the pop up window 66 having components including a label, a logo and may be an advertising component, together with the content for the window and controls, such as data submission controls. The Device-Resident VT Proxy can be represented on a multi purpose digital device or a token specific digital device.

The virtual token fulfills the modern requirements to: reflect higher value as a representation of a package of contextually related assets and services; be simple and consistent; be secure; be interactive; reflect the influence of the involved parties; and combine the benefits of persistent elements and elements with a limited life span.

Figure 1:
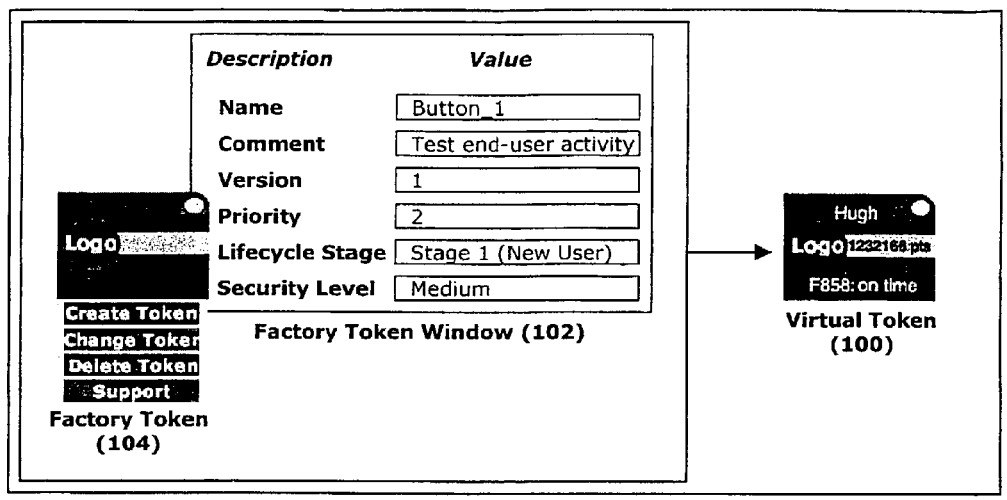
FIG. 1 is a schematic diagram of generation of a virtual token.

Although a virtual token is presented as if it was a single tangible object 100, as shown in FIG. 1, it is technically comprised of a number of data objects retrieved from computer memory or received via a communications link and assembled together dynamically at runtime to form a virtual token instance. This approach provides design flexibility and satisfies requirements for user simplicity, architectural integrity, minimised storage, fast transmission, and optimal security.

A Cluster VT 820, as shown in FIG. 8, is a group of contextually related VTs centered on a Primary VT 840 and linked via a VT Cluster Map 880. A VT Cluster Map 880 is linked to a Primary VT 840 and Secondary VT Proxies 882, 884 and contains a Dependency Map that identifies which VTs are interdependent and the type and nature of the interdependency as illustrated in the VT Cluster Map data block 760 shown in FIG. 7. Each VT can store its own interdependency rules. The VT is accessed by a VT Proxy 800 and the VT may use Connectors 862 to 864 and 866 to either create, manage or control, respectively, the item referred to by the VT 840. All of the elements shown in FIG. 8 are processing elements with the connections external to the Cluster VT 820 denoting communications links that may extend over the network 6. The address of the Primary VT 840 identifies the address of the Cluster VT. The Primary VT reflects the stable elements in the cluster with Secondary VT Proxies 882, 884 appearing and disappearing over time (the perceived value of the VT, therefore, is also relative to a point in time). A Secondary VT Proxy 882, 884 may reference a local VT or a remote VT and may appear in multiple Cluster VTs. Each Proxy instance is unique but each references the same VT. Since each Secondary VT Proxy 882, 884 is uniquely described by a Secondary VT Proxy data block 780, it can augment or filter the underlying VT but cannot override or change the underlying VT to ensure item operations remain verifiable by the VT item owner.

There are two versions of the VT Proxy 800: Device-Resident or On-Demand. The Device-Resident version is stored on a device such as a PC, Web-phone, Web-TV, WAP-phone, Web-enabled PDA, or other such device and can provide one click operation of a VT capability including logging in and connecting to the VT system via the communication network 6 if the Device-Resident VT Proxy 800 is offline. Depending on its security setting there may be a visible authentication step. The On-Demand VT Proxy 800 is delivered to the client device from the VT system when the VT address is accessed via a communications network 6 using a network-client application native to that network such as a Web browser on the Internet. Each VT is uniquely addressable in a human readable and memorable form, as a URL for example. FIGS. 5 and 6 illustrate the interface 50, 60 that conforms to the "small interface footprint" requirement of a VT to facilitate portability across devices with different sized displays. The Virtual Token Proxy Icon 52 represents the Virtual Token Proxy Icon data block 62 and contains sufficient information to present the relevant state of the VT and the contextually relevant capabilities that can be triggered. The Virtual Token Proxy Icon 50 represents a compressed version of the Icon and is used only in the Device-Resident VT Proxy 800 to minimise interface footprint when the Icon is not actively being used. The user may switch between the two versions of the Virtual Token proxy Icon 50, 52 by selection. The Expanded Virtual Token Proxy Icon 52 may be configured to revert to the compressed version 50 after a timeout period after a specified period of inactivity. The Logo provides branding and the ID Label reflects the unique and personal nature of a VT. Once a capability is triggered, it may cause a VT Popup Window 56 to be displayed to collect user input and display capability results and a capability session is entered. The capability session will remain until the user or the remote capability system disengages or a timeout occurs. As mentioned previously this is a business level session and may or may not reflect a technical level session. The VT Popup Window 56 and VT Popup Window data block 66 also support the "small interface footprint" requirement of the VT. This interface is similar for the Primary VT and all Secondary VTs in a Cluster VT 820. The VT Proxy Icon data block 64 and VT Popup Window data block 66 are components of the characteristic data of the VT Proxy data block 730, as described below. It will be apparent to those skilled in the art, that the VT interface includes native device interface characteristics such as single-click, double-click, drag-and-drop, resize, right-click for properties/local function display, and interface characteristics uniquely supported by the VT proxy 800. One unique characteristic of the Device-Resident VT Proxy 800 is the ability to render the interface 50, 52, 60, 62 on a classic MS-Windows® desktop. Classic desktop Icons on the other hand are small and static in nature and do not support the VT interface requirements natively.

The VT Item Master Connector 864 represents an active element that resides within a control system of an item agent and is used to request the creation of an item or the execution of an item specific capability. An example would be a connector integrated with a digital airline reservation system used to book a flight ticket and manage it. The VT Item Connector 862 represents an active element that resides within the control system of an item and is used to relay item status information and act as a control link to the item capabilities when an active item operates in an autonomous fashion from an Item Master control system. An example would be a connector integrated in a refrigerator control system for remote control and monitoring. The VT Item Control Connector 866 also represents an active element that resides within the control system of an item agent for the purpose of managing the VT remotely. An example would be a connector integrated with an airline Customer Relationship Management (CRM) system or a connector integrated to the warranty management control system of a refrigerator manufacturer. The VT Connectors 862, 864, 866 may be downloaded in advance or as required to operate on the control system of the item or item agent and interact with the VT system via the communications network 6. Alternatively, the VT Connectors 862, 864, 866 may operate on the VT system and interact with the item or item agent using their native interface standard via a communications network 6. The VT Connectors 862, 864, 866 may be discrete elements integrated to multiple item or item agent control systems or they may be combined. In some cases the control system of the item or item agent supports all the required functionality.

VTs within a Cluster VT may be of mixed type with some VTs using VT Connectors 862, 864, 866 to access items, and some VTs simply describing the item. An example would be a VT Cluster containing a Primary VT that represents a relationship between an individual and a travel consultant (the item is described and no VT Connectors used) and where the travel booking is provided via an airline and a rental car agency (VT Connectors 862, 864, 866 used). As illustrated by this example, it is possible for a VT Cluster to provide an aggregation service for items from different item agents. Alternatively, a single item agent can perform the aggregation and reflect the different Item types through the VT Connectors 862, 864, 866 integrated to their control system.

A VT may be a disposable type (single use) or a persistent type (used more than once). Although any VT may be of either type, Primary VTs are typically persistent (such as a representation of a relationship between an individual and a travel company) and Secondary VTs are typically disposable (such as a representation of an airline flight ticket or flight upgrade coupon). Secondary VTs relate or attach to one or more VTs as recorded in the VT Dependency Map in the VT Cluster Map data block 760. An example of related VTs would be a flight reservation and a rental car reservation. If the flight were cancelled there may no longer be a need for the rental car reservation or if the flight were delayed, there would be a need to delay the rental car reservation. An example of attached VTs would be a flight reservation and a flight upgrade coupon. The flight upgrade coupon can be applied to the flight reservation to upgrade class of service after which it is detached from all VTs and disposed. These dependencies can be resolved at runtime by the VT system cross matching and processing the relevant VT dependency rules. This operational sequence, as any other operational sequence in the virtual token system, can be rolled back.

Figure 7:
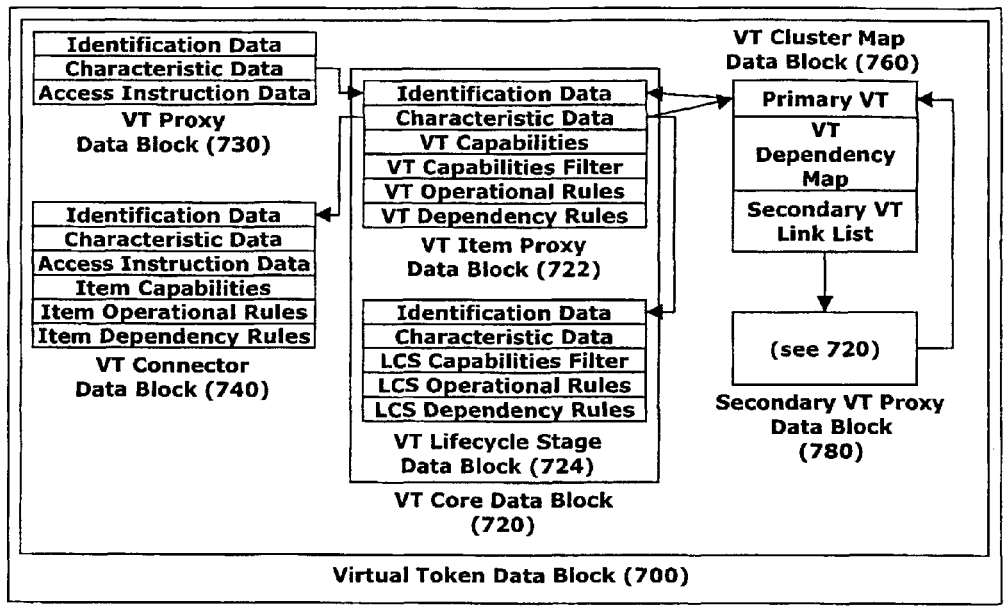
FIG. 7 is a diagram of a data structure of a virtual token.

As illustrated in FIG. 7, the core data that comprises a Simple VT is structured in two main memory blocks each residing in a memory unit on a different computer: a VT Core data block 720 and a VT Proxy data block 730. The VT Core data block 720 contains information specific to the Simple VT and resides in a database, preferably as an object or set of objects in an object-oriented database or directory, in a memory unit on a secure VT system connected to a communications network 6 such as the Internet. A VT Core Data block 720 is processed by a Simple VT active element such as the Primary VT 840 as illustrated in FIG. 8. A VT Proxy data block 730 may be stored in the memory unit of one or more network-enabled access devices (such as a PC, Web-phone, Web-TV, WAP-phone, Web-enabled PDA, or other such device) and is processed by a VT Proxy 800 also stored at that location. A VT Proxy data block 730 and Device-Resident VT Proxy 800 may be transported to one of the aforementioned devices in the form of portable memory media (such as a smart card, disk, CD, digital tape, memory stick, or any other such device). Alternatively, they may also be transported in advance (Device-Resident version), or as required (On-Demand version) over a wired or wireless communications network 6 using an appropriate protocol (http, WAP, SMS, FTP, SMTP, or any other appropriate transport protocol). The VT Proxy 800 processing may be supported by local functions in the target device such as operating system functions or Web browser functions. It will be apparent to those skilled in the art that the VT Proxy 800 may be implemented in many different computer languages such as C++ or Java and may be executed by a variety of operating environments such as Unix, MS-Windows®, or a Java® Virtual Machine. It will also be apparent that the VT Proxy 800 operation and display functions may be implemented as a combination of html, Javascript, XML, ActiveX®, Plugins, or Java applet data downloaded on request via a standard network client application capable of processing that data (such as a Web browser). As wireless technologies get less expensive and can fit into a smaller space, it is anticipated that a physical virtual token will exist in the near future (to be referred within this document as a VToken) and in which the VT Proxy data block 730 and VT Proxy 800 would be stored and processed. The VT Proxy data block 730 includes identification data and characteristic data for the VT proxy 800, together with access instruction data, such as network addresses and communications protocols.

A VT Core data block 720 can be further decomposed into an Item Proxy data block 722 and a Life Cycle Stage (LCS) data block 724. Both data blocks contain identification data, characteristics, rules and capabilities or capability filters, described below. The Item Proxy data block 722 contains data that is generic to VTs of this specific type (as specified by the template selected to create the VT) as well as data specific to this VT. The LCS data block 724 contains data that is unique to the VT's current Life Cycle Stage as described in the Life-Cycle Program (LCP). A Life Cycle Program is a container data structure for all the Life Cycle Stages that apply to a specific type of VT. A VT Account may include a number of Life Cycle Programs that each include LCSs. The LCSs each refer to tokens that are in that stage of their life cycle. An Item Proxy data block 722 contains a reference to a LCS data block 724. Although it is not a technical requirement that these be two separate data blocks, this is the preferred structure to minimise memory usage. Although a LCP can be tailored to an individual, it is expected that a large number of individuals will share a common LCP to minimise the owner's management burden. The use of linked data blocks also allows a VT Life Cycle Program to be changed quickly and cleanly (unless this option was restricted at creation time). An example of a Life Cycle Program is described below.

There are a number of optional Connector data blocks that are also referenced by the Item Proxy data block 722. These data blocks and their equivalent processing-element (as described previously) are distributed, stored and processed in a similar fashion to the VT Proxy data block 730 and VT proxy 800. A VT Connector data block 740 may be stored in the memory unit of one or more network-enabled item or item agent control systems (such as an airline reservation system or CRM system) and is processed by the respective VT Connector 862, 864, 866 also stored at that location. The VT Connector data block 740 and VT Connector 862, 864, 866 may be transported to one of the devices in the form of portable memory media (such as a smart card, disk, CD, digital tape, memory stick, or any other such device) to be preloaded into the memory unit of the item agent control system. Alternatively, they may be transported over a wired or wireless communications network 6 using an appropriate protocol (http, WAP, SMS, FTP, SMTP, or any other appropriate protocol) to be loaded into the memory unit of the item or item agent control system when required. Alternatively, the VT Connector data block 740 may be stored on the memory unit of the VT system if the associated VT Connector 862, 864, 866 fulfills its role by interacting with the item or item agent using their native interface standard via a communications network 6. It will be apparent to those skilled in the art that the VT Connector could be implemented using a variety of different technologies depending on the scenario including (but not limited to): EJBs, CORBA services, servlets, applets, scripts or rule sets. It could use a variety of protocols including (but not limited to): SOAP, CORBA, JINI, Bluetooth, JTS, JMS, TIBCO, MQ-Series, X.509 or other similar protocol.

The VT Cluster Map data block 760 is stored in the memory unit of the VT system. It is created and linked to a Primary VT Item Proxy data block 722 when there is a Secondary VT Proxy data block 780 that needs to be related or attached to the Primary VT Item Proxy data block 722. It is unlinked and deleted when there are no Secondary VTs associated with the Primary VT. Although it is not a technical requirement that these be separate data blocks, this is the preferred structure to minimise memory usage.

Secondary VTs 886, 888 are created by the VT System based on an event received from a VT Connector 862, 864, 866 which may be as a result of a capability invocation request. As an example, triggering a "book a flight" capability associated with a Primary VT 840 representing a relationship with an airline will result in an event returned by the Item Master Connector 864 that triggers the VT system to create a Secondary VT 886, 888 representing an airline flight ticket. This Secondary VT 882, 884 links in to the VT Cluster Map 880, which would also be created at this time if it doesn't already exist. A Secondary VT 882, 884 may also be created by the VT system based on an asynchronous event. As an example, an event may be received from the VT Item Control Connector 866 integrated with the airline Customer Relationship Management (CRM) system that triggers the VT System to create a Secondary VT 882, 884 representing a flight upgrade voucher for a specific user. A scan of the identification data of Primary VTs 840 in the VT system identifies a match and the flight upgrade voucher Secondary VT 882, 884 links to the VT Cluster Map 880. Since there is already a linked Secondary VT 882, 884, dependency rule matching is triggered. In this case the flight upgrade voucher Secondary VT 882, 884 contains a dependency rule that it can only be applied against full fare tickets. In this case the flight ticket Secondary VT 882, 884 is full fare so the VT Cluster Map logic triggers the operational rules. This could, for example, result in a status update to the VT Proxy 800 alerting the user to the option of upgrading their presently booked flight and presenting the flight upgrade voucher Secondary VT 882, 884 to them. The user would then trigger the "redeem voucher" capability which would result an event returned that alters the flight ticket Secondary VT 882, 884 and another event that causes the flight upgrade voucher Secondary VT 882, 884 to delete itself and its link in the VT Cluster Map 880. Events with identification data that cannot be matched to an exiting Primary VT 840 from a VT Item Master Connector 864 or a VT Item Control Connector 866 are linked to a Primary VT 840 associated with the VT Account that owns the connector (in the previous example, the airline VT account). This VT is an example of a Supplier Relationship VT. This strategy allows the VT account manager to review unsolicited offers that may be provided through a third party VT Connector such as a Rental Car company. If there is a strong relationship, the VT Account manager may simply tag that event type to be accepted automatically in the future and simply perform a periodic audit on the data being passed in unsolicited events.

Figure 4:
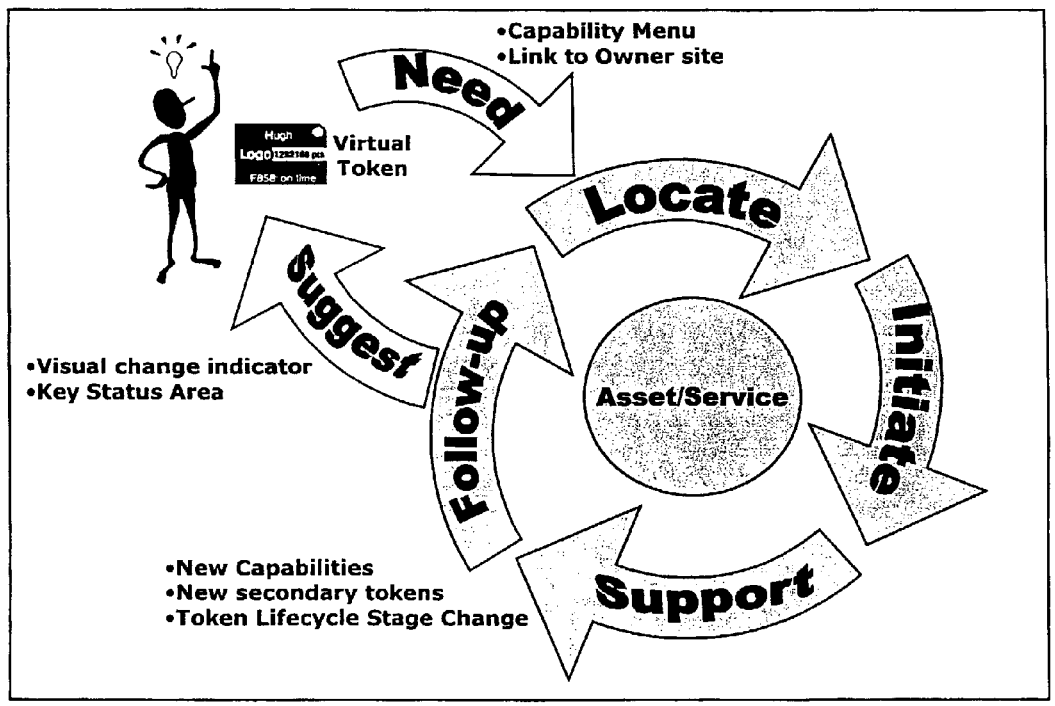
FIG. 4 is a schematic diagram of usage of a virtual token.

As illustrated above, a Cluster VT 820 provides greater convenience and manageability than a large number of discrete tokens. The advantage for the airline is branding, personalisation, and manageability. The advantage for the end-user is a concise and tangible representation of their relationship with the airline and items of value related to the airline. The complexity associated with large numbers and permutations of offers can be difficult to manage with a traditional architecture. In the VT system, since each token is individually configured with its own life cycle and operates autonomously, permutations are not manifested in complex code. Instead, Secondary VTs 882, 884 are simply added to, or removed from, other virtual tokens. FIG. 4 illustrates that a Cluster VT 820 fulfills all contextually related customer needs in a single concise object and a single address reference. It illustrates the adjustment of the life cycle stage of a token to match a user cycle of use of assets or services that match their needs. Status changes to the virtual token are represented with corresponding visual indicators for the user.

The multi-part and multi-location data structure of a token is invisible to the user to the extent that a single unified description of a virtual token can be considered. The following details of the virtual token functional data will conform to this convention to illustrate the user's view of the virtual token data.

A virtual token, as shown in FIG. 7, has unique identification data which, inter alia, specifies an item the token represents. The item is an asset or service, and may alternatively or also be a potential asset or service. The token also includes embedded data, which may be encoded, that defines a set of rules and capabilities. The rules define how the item is to be used, and in turn how the item or token behaves. In applying to use of the item, the rules relate to a set of capabilities which may directly or indirectly apply to the value of the item, which is, in turn, reflected in the value of the token.

Items a virtual token could represent include:
(i) Assets, eg refrigerator, car ownership or home;
(ii) Potential Assets, eg stock option certificate, or a lottery ticket;
(iii) Services, eg flight lounge membership, airline flight ticket; and (iv) Potential Services, eg dentist consultation booking or flight upgrade coupon.

The distinction between some assets and services may be non existent in a service economy For example, some might view an airline flight ticket as an asset rather than a service.

The identification data also includes data identifying the token itself, a parent token, a template used to create the token, data identifying the owners of the token and an access list. The token identification is used to reflect its unique characterisation. The parent token and the template used to create the token reflect its ancestry and influence its structure and characteristics. The tokens reside in a hierarchy. The hierarchy includes a number of distinct hierarchies, such as the one represented by the VT Cluster Map 880. A token's ancestry may extend to the inheritance of specific behavioural rules and/or characteristics. An owner may be any person, such as an organisation, company or individual. The original owner is the original person who provides the item represented by the token, such as the token creator. An owner may transfer ownership to another person or group of persons. Alteration of a token is controlled via an access list of persons controlled by the owners. Also the ownership may be declared open so use of the item is not controlled by ownership but by possession. This distinction may be of use in cases where an item is being given away for free. For example, a number of tokens representing a car service discount could be made available on a first come first serve basis.

The identification data also includes a reference to the token's present Life Cycle Stage in its Life Cycle Program. Each stage in a Life Cycle Program defines a set of characteristics, rules, and capabilities that are contextually relevant to this type of token item as specified by the virtual token administrator. Transitions through the stages in the Life Cycle Program may also trigger automatic adjustment of the token ownership. The Life Cycle program is derived from a template used to create the token.

Unlike currency, which is owned by the possessor, a virtual token can reflect an ownership and access structure that can span multiple parties and changes over time. An example would be a virtual token representing the changing nature of the ownership data associated with a software product. The token could:
(i) represent a software product available for purchase (i.e. owned by a vendor); then
(ii) present the delivery/billing status of the software product once ordered; then
(iii) provide the activation trigger for the software product in the form of a capability; then
(iv) provide the warranty for the software product as a referenced virtual token.

As the token moves through its life cycle, a set of core embedded rules and/or capabilities remain fixed with other rules and/or capabilities changing to reflect the alteration to the state of the underlying item the token represents. The ownership and access rights of each party may also be altered automatically. If this was a financed item other owners, such as a bank, may be added. If the "tradable" characteristic is enabled, the token and its value could be subsequently transferred to someone else. The previous owner, however, may choose not to enable this characteristic (for example the token could represent a digital artwork on loan).

The virtual token embedded data block contains the information required for capability invocation including but not limited to: function name; function service address; fixed function parameters; and variable function parameters. The variable function parameters would be solicited when the token is triggered or populated automatically. The embedded rules may direct that the parameters be populated using characteristic data associated with the token or data returned from a previous capability invocation (or other data source).

Capabilities can be internally or externally sourced. Internally sourced generic capabilities are associated with simple computational functionality such as: Interpret-Rule (y), Set-Timer (x), Clear-Timer (x), or other such functions. Externally sourced generic capabilities are associated with common functions related to business objects such as assets or services. Externally sourced capabilities may be specific to a token item type or category. External capabilities can be supplied by the original token owner (token creator) or a third-party capability supplier. Systems for externally sourced generic capabilities are not described in detail, as they are not an element of the virtual token system. Some externally sourced generic capability categories include:
i. Marketing: incentive type (contest), or incentive points (loyalty rewards);
ii. Contact: provision of contact information or execution of contact;
iii. Finance: financial benefits or services, e.g. a predefined charge amount.
Book_Rental_Car (x), Cancel-Rental-Car (x) would be examples of external capabilities specific to a token item (i.e. a Car-Rental service token).

It is important that generic characteristics and capabilities be defined since virtual tokens will be used frequently and should be convenient, recognisable, and simple to use. Since the user may wish to access the token from a variety of devices its display and operation footprint (basic size and shape) must be compact. As such, when a new token is created, generic characteristics may be modified, but only within specific tolerances. Since virtual tokens can be created from a variety of sources, presenting them in a standard format within standard containers ensures that users are provided with a seamless visual and operational experience. As patterns are observed through the deployment of large numbers of tokens, it is expected that some item-specific capabilities may become generic capabilities over time.

Some of the capabilities represented by the embedded data of a token relate to generic characteristics which may include:
(a) Token Name
(b) Comment
(c) Start and stop date (lifespan)
(d) Start and stop window (time window available during a given day)
(e) Security Level
(f) Page Lock (token operation is restricted when moved from a pre-defined Web page)
(g) Priority
(h) Version
(i) Management interface URLs (to brand the management interface)
(j) Icon image URLs (state-specific)
(k) Banner Ad URL (optionally for display in a token triggered popup window)
(l) Stand-alone mode (indicates no connection to external rules)
(m) Local/Remote profile support (a token may be associated with a person profile)
(n) Access list of authorised persons
(o) Login required (ie password protected)

Also embedded with the token is data required to execute an access request to the location when the token is triggered. The token can be triggered by selecting the icon when displayed, for example, by single or multiple clicks of a pointing device or other such selection technique as supported by that device such as touch-sensitivity, voice activation, or other techniques of a similar nature. The token is represented by the display of the icon generated on a device such as a computer or telephone or other device that contains a display such as Web-TV or PDA. The executable data may take a number of forms. For instance, it may comprise a distributed agent, a program or plug in, an applet, an ActiveX control or HTML code (or other executable format of a similar nature).

There are a number of potential trigger conditions for a token including:
(i) Immediate (action occurs on token trigger);
(ii) Specified (action occurs on specified token trigger);
(iii) Random (action occurs on a random token trigger);
(iv) Combination (action occurs after a specific sequence of token triggers);
(v) Collection (action occurs after specified collection of token triggers); and
(vi) Construction (Accumulation of weighted tokens until total weight achieved).
Some of these triggers types (Combination, Collection and Construction) are associated with groups of tokens held within a container.

Tokens may be grouped in containers that specify the relationship between the container elements or contents. If the tokens in a container are linked in a list, the identifying data for tokens within a container contain a reference to the next token in the list with the head of the list being specified in the container data. A container may trigger some predefined action once a specified container status transition occurs. Container status is relative to its contained tokens and may be altered by the triggering of said tokens. Example containers include Accounts (for owners to group generated tokens), VT Jars (for users to group received tokens), Life Cycle Programs and smart-containers (group of tokens that must be triggered in some container-specific sequence to trigger a container-specific action). A container and its characteristics may be represented graphically, in a similar manner to token icons, on a visual display.

Virtual token data may reside in various locations and be assembled when the token is selected or accessed. As an example, html-based token access data may consist of a URL that includes parameters required to trigger the token. One parameter may be an index to a data object stored at the same location as the VT processing system. When the token data is sent to the VT processing system, the data referenced by the index is retrieved and replaces the index in the reconstituted token. If the token data is encrypted, this process would include the additional step of decrypting the data first using an encryption key. The encryption key could be obtained by retrieving an encryption table index (passed within a cleartext parameter in the same URL that contained the encrypted data) and indexing into an encryption key table to retrieve the key used to encrypt this token.

Virtual tokens are always uniquely represented and stored but, immediately after creation, may be unique or replicatible in nature. For instance, the token 100 may represent a unique personal travel token as shown in FIG. 1, where the item is a travel club membership and the owner is the travel company. Added to the token details is specific data, such as start and stop dates which specify the life of the token, and an address, such as a HTTP URL, of the token location on a communications network, such as the Internet. Also added to the token is graphical image data, such as for example the travel company's brand image representing the relationship between the individual and the company, as shown in FIG. 1, that is used to generate an icon of the token 100. This graphical image data can be dynamically altered to reflect token status or token operation results within the displayed icon (such as increase in frequent flyer points). This type of travel token is unique from conception. If though, for example, a token represented a 50% discount voucher for a car rental, which is replicated 10 times and offered to fifty people on a first-come-first-served basis, it is not unique from conception. Each of these tokens is uniquely represented and stored, but the access rights are open. It is only when people trigger these tokens and set the ownership data and access rights that they become truly unique (and personal).

The virtual token, as described above, constitutes a new form of tradable asset which is unique in the sense that the rules associated with it are embedded in the asset. The asset and the rules defining its use are determined when the token is interpreted by a computer device. The value of a token is a combination of its definitional data and rules, and its tradable value is not necessarily predetermined. It is the tangible combination of the perceived values of: branding, ownership, simplicity, accessibility, immediacy, universality, personalisation, functionality, partnership, packaging (asset/service mix), life cycle and core value (i.e. the token item) that combine to create something that is of higher perceived value than the token item alone.

Figure 2:
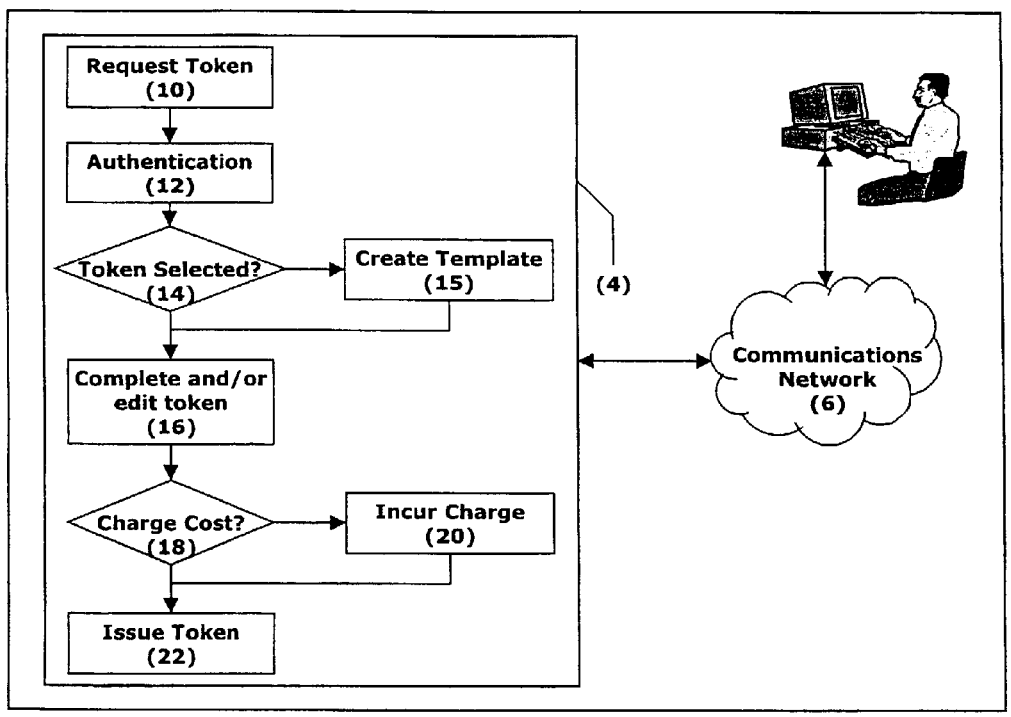
FIG. 2 is a block and flow diagram of a system for providing a virtual token.
Figure 3:
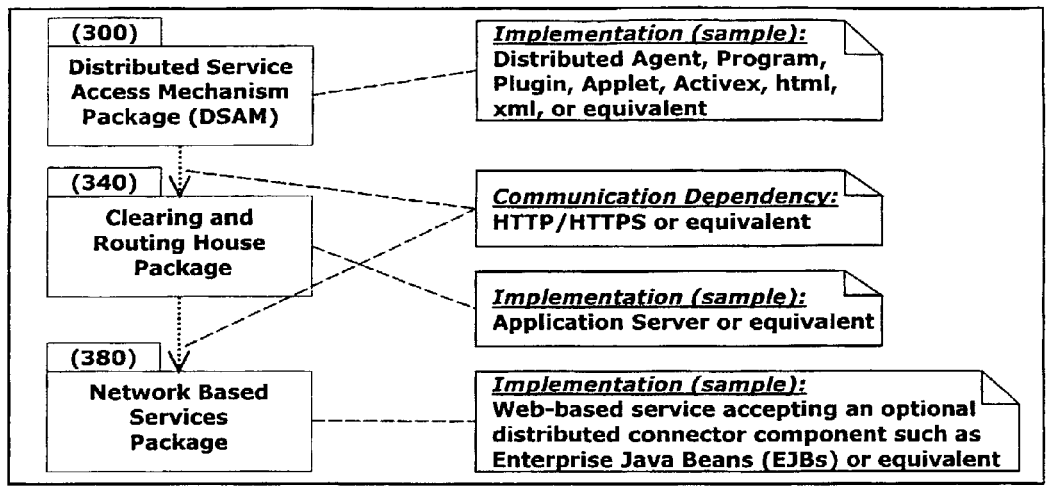
FIG. 3 is a logic diagram of a system for processing a virtual token.
Figure 9:
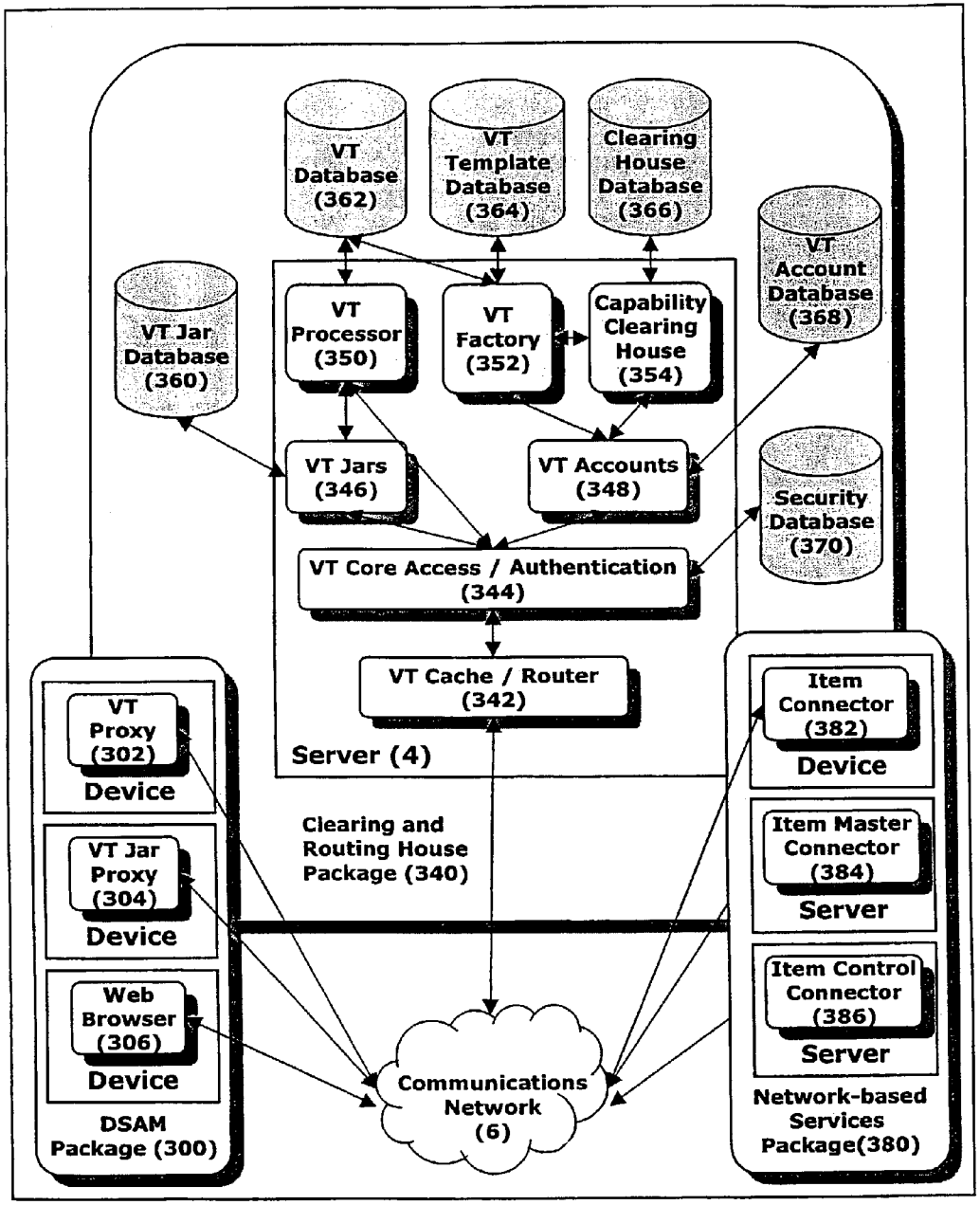
FIG. 9 is a block diagram of a system for processing a virtual token.

A VT system for generating and processing virtual tokens, as shown in FIGS. 2, 3 and 9, encompasses three logical components, which are preferably software packages but may also be implemented at least in part by dedicated hardware circuits, such as ASICs. A Distributed Service Access Mechanism (DSAM) package 300 contains the software modules responsible for service access and includes a processing component 302, a DSAM client, that interprets the token-proxy data and handles device-specific Icon display, Icon trigger techniques, Capabilities display and selection, and token status display. The DSAM client is embodied in a Device-Resident and On-Demand version. This package also includes software to distribute the DSAM client and ensure the client is always up-to-date. A Clearing and Routing House Package 340 contains the software modules responsible for virtual token creation, management, routing, and processing. A Network-based Services package 380 contains the software modules responsible for interconnection to external control and capabilities services.

The VT system, as shown in FIGS. 2 and 9, includes a factory server 4 which can be contacted using the communications network 6, such as the Internet or a Local Area Network (LAN), and includes standard web server software for this purpose. A factory interface 102 for the server 4 is accessed using standard Web-based techniques as illustrated in FIG. 1. The server 4 also includes a token factory application to generate and issue a virtual token to an owner requesting the token. The factory application is invoked when an owner connects to the server 4 and requests generation of a token, at step 10. On requesting a token, the owner enters an authentication procedure at step 12 and enters authentication data to identify the owner. The token is then selected at step 14 from a hierarchy of different tokens. The hierarchy is arranged in a nodal structure, where each node represents a class, category or type of token and may also represent templates for a token which are ultimately used to generate the token. If a token is required that does not presently exist, the owner enters step 15 to select an existing token template and modify it as required. The new template is then placed in the template hierarchy for future use, and the factory application generates a new token for the owner's use. Once the appropriate token is selected, details need to be entered into the token to fully identify the item, owner and the token itself, at step 16. If the token creation has any associated cost attached to it, which needs to be charged for, this is determined at step 18. If so, the owner is charged accordingly at step 20 using an existing billing infrastructure, such as EFTPOS or a telecommunication carrier's billing systems. The token is then compiled from the templates and the entered data, and is issued at step 22 by storing it in the token database, displaying the token's unique address in the network to the owner, and transmitting the token-proxy data to equipment of the owner. The owner may then distribute the token proxy data and token address for use by a person, as mentioned previously.

The tokens generated may advantageously also be factory tokens 104, which can be used to generate other types of tokens, including equivalent or lesser types of factory tokens. The factory tokens can then be repeatedly used to generate tokens using similar procedures to the token factory application. Each token is individually manageable though the factory interface 102 and, due to the hierarchical relationship of tokens, token subtrees (i.e. a token and its child tokens) are also manageable though the factory interface. Management operations include enabling the token, disabling the token, editing the token, deleting the token, and adding a child token. The interface 102 for a factory token is similar to the interface provided by the factory application server except that the template and token hierarchies and the templates are not accessible. Factory tokens are designed for controlled distribution to token resellers and are thus constrained for security and commercial reasons.

The VT system for processing the tokens when triggered, as shown in FIG. 9, includes the clearing and routing house (CRH) 340 which may constitute an application server 4. The CRH is responsible for processing virtual token requests and routing them to the appropriate CRH components, which may be distributed in the network 6. Once the token is processed, a subsequent clearing and routing function may occur to trigger external capabilities.

When the DSAM client is triggered, the token-proxy access instructions are executed to send a request using a protocol, such as HTTP/HTTPS, to a location on the communications network, the location being the application server of the clearing and routing house. Alternatively, the address for a token (URL) can be entered into a web browser which will generate a request to the application server of the clearing and routing house. The request includes identifying data, which is used by the application server to first authenticate the token and then determine where the request should then be routed. If the identifying data includes a reference to other data the referenced data is retrieved and the reference replaced. There are a number of possible examples of referenced data, such as an index to additional token data stored in the communications network, or an index to session-related information stored in a cookie file which is sent in parallel to the request data. The reconstituted token is then processed. Subsequent processing involving external capabilities will only occur if the token trigger conditions have been met.

Routing is also determined on the basis of the identifying data and will relate to the item represented by the token. The application server may, for example, execute a Java script, a Java Bean, or a CORBA service (or comparable processing component) to fulfill generic capabilities or, if an external capability is required, then the request is routed via the network-based service interface process. Updating the graphical image data associated with the token allows token status or operation results to be reflected within the icon or in a form associated with the icon (e.g. sub-text, floating text, etc). This update processing may be executed by the clearing and routing house (e.g. a streaming icon application server) or may be presented by the DSAM client.

The components of the VT system, as shown in FIG. 9, and their operation are described below with reference to the airline program example.

An airline decides to issue VTs to their customers to represent their customer relationship in a tangible and personalised form. The airline subscribes to a virtual token service and has a Clearing and Routing House Package 340 installed on computer servers within their company's network or subscribes to a completely network hosted service. In either case, the airline integrates a combined VT Item/Item Master Connector 382, 384 by installing the Network-based Services Package 380 to their back-end systems supporting flight booking, and flight information. They also integrate an Item Control Connector 386 to their Customer Relationship Management (CRM) system to manage customer segments using VT Life Cycle programs. This integration also allows the VT activity to be consolidated with other customer relationship technologies such as phone or email and incentive program systems such as a Frequent Flyer program management system. The airline can use a VT Account management interface to configure the Item Connectors 382, 384, 386 or, if their back-end system supports a Directory enabled network (DEN) standard or a service exchange standard (such as that provided by TIBCO.net, CommerceOne® eCo Framework, or UDDI) the Item Connectors 382, 384, 386 would configure themselves automatically.

Since this airline wishes to provide a full service travel package, they may wish to provide VTs related to items that are managed by a different company such as a Rental-car Company. The airline may provide this capability in a number of ways. If the airline back-end system is integrated to the rental car system, there are no additional steps required. In all other cases, the Rental-car Company will need to subscribe to a virtual token service to enable their capabilities to be published in the airline VT Account management interface. The Rental-car Company would then integrate a combined VT Item/Item Master Connector 382, 384 to their back-end systems supporting car rental booking and information which would become accessible from the airline Clearing and Routing House Package 340. Those VT Connectors 382, 384 would be configured as previously described.

The airline VT Account administrator would then log in to the VT Account 348 by triggering their VT Factory Token 104 or entering the unique account address (e.g. Internet URL) into a Web browser or VT Account management application which connects to the VT Factory 352 via a communications network 6 (e.g. the airline LAN or the Internet) to configure their VTs which are stored in a VT Database 362. The configuration can be performed on an individual basis or a bulk basis, based on an imported customer file or link to a customer database. The Primary VTs 840 are created through the VT Factory 352 using standard templates or templates created by the airline which are stored in a VT Template Database 364. The airline VT Account administrator then creates Life Cycle Programs, using a LCP template, for each of the customer segments that describe what capabilities, rules, and VT dependencies apply at each Life Cycle Stage (LCS). This configuration step includes setting the event triggers that cause a VT to move from one LCS to another.

The airline then distributes the VTs to their customers by coding a VT Proxy 302 onto distribution media such as a CD-ROM business card and gives them out in their flight lounge, emails them to the customers, or presents them on their Web site for download or drag-and-drop (if supported) to the customer device. The VT Proxy 302 distribution also includes a VT Jar proxy 364, which is also installed if not already present on the customer device. The VT Jar Proxy 364 connects to the VT Jars 346

The customer VT Proxy 302 is now available for presentation of specific customer specific status information or instant access to capabilities. A typical processing sequence would be for the customer to be offline (disconnected from the communications network 6) and select a "book a flight" capability displayed in the VT Proxy Icon 52. That causes the VT Proxy 302 to process its Access Instruction Data 730 to connect to the communications network 6 via the customer's network provider or a network provider supported by the VT service. Once connected, the VT Proxy Data Block 730 is transmitted to the nearest VT Cache/Router 342 in the communications network 6 to be routed to the VT Cache/Router 342 in the appropriate Clearing and Routing House Package 340. At all times, the VT Cache/Router 342 network ensures that accurate data is transmitted in an efficient and non-repetitive manner. A process used to identify data differences operates transparently on encrypted data The VT Proxy 302 will be instructed to change its network access point if the targeted VT Cache/Router 342 identifies that a more efficient connection exists to a different VT Cache/Router 342. This is advantageous for travelers who's VT Proxy 302 is on a laptop and they move between countries.

Once the request enters the VT Cache/Router 342 of the target Clearing and Routing House Package 340, it goes to a VT Core Access/Authentication module 344 to enact the checks associated with the VT as specified in a Security database 370. The security for the Clearing and Routing House Package 340 will be apparent to one skilled in the art as it conforms to industry standards, such as Cisco® SAFE, X.509, etc. This may involve a customer X.509 certificate check or may simply involve a password prompt. If there is a requirement to prompt the customer to input details, this data is returned and processed by the VT Proxy 302 and presented to the customer via a popup window 56. Once authentication has completed, there is an optional security session that can be established with the customer device that stores a time-limited encrypted session key on the device which is passed with all accesses within a specific time period to eliminate the need to login on every request. If the airline has its own authentication system, the customer request may be redirected to the airline authentication system which performs the authentication step, then attaches its own certificate to the end of the request then redirects it back to the VT Core Access/Authentication 344. At that point, the VT Proxy Data Block 730 is decrypted using a VT-specific decryption key and the request is routed to the VT Processor 350.

The VT Processor 350 takes the capability index from the VT Proxy Data Block (730) received, identifies the capability, and triggers the VT operational rules. In this example, a capability request is issued to the Item Master Connector 384 to "book the flight". The results of the capability request are returned to the customer in the popup window 56 and data may be exchanged between the Connector 384 and the Proxy 302 to complete the session.

As a result of the capability request, an event is received from the Item Master Connector 384 indicating that this customer now has an airline ticket and associated flight reservation. This event is handled by a VT Processor 350, which creates a Secondary VT 886 associated with the airline Account and scans the Identification data of the Primary VTs 840 in the airline account to find a match. Once the customer's Primary VT is located, a VT Cluster Map 880 is created and a Secondary VT Proxy 884 entry created to reference the Secondary VT 886 (this allows a Secondary VT 886 to be referenced by multiple Primary VTs 840 if desired). This new Secondary VT 886 is now visible to the customer, in some fashion, through the VT Proxy interface 54. The customer can now trigger capabilities related to the Secondary VT 886, which represents the airline ticket as well as those of the Primary VT 840.

Whenever a change occurs to a customer VTs (such as a flight delay), an event is sent to the VT Proxy 302. If the customer device is offline, the data change is registered in the Router/Cache 342 and will be relayed as soon as the device goes online next (even if the customer goes online to browse the Web and not to trigger a VT capability). If the customer is online, the status change is immediately reflected in the VT Proxy Interface 54. Since a customer may have more than one Primary VT 840 associated with different Accounts, a VT Jar entry is created in a VT Jar Database 360 by the VT Jars 346 to act as a container for VTs related to a customer. The Jar Proxy 304 is used for access and display in a similar fashion to the VT Proxy 302. Transmission of Jar 360 data may be used between customers and VT Systems 2 in situations where it is more efficient than transmitting the individual VTs contained in the Jar.

There are numerous utility scenarios that can be described involving VTs, which will be apparent. One scenario that may not be obvious is a VT that represents a household cluster. This VT could contain a Primary VT 840 to represent the house, and Secondary VTs 886 representing the Intelligent Home controller, the house mortgage, and the house insurance policy. The Secondary VT 886 representing the Intelligent Home Controller could have its own Secondary VTs 886 representing the Smart appliances in the house, such as a refrigerator equipped with an embedded VT Item Connector, and the home alarm system. A physical VToken device could carry a representation of your home with you in the form of a wireless smart card with display. The Clearing and Routing House Package 340 could be contained in the Intelligent Home Controller and accessed via the home network via the TV set. The home owner could configure one VT to be restricted to access features, which is accessed by the VT Proxy 302 that they carry around, and another offering full features, which is accessed by a VT Proxy 302 that is kept in a house safe or safety deposit box. Using VT Connectors, the home alarm management can be handled by an outside company, and the manufacturer could monitor the Secondary Warranty VT in the refrigerator.

Many modifications will be apparent to those skilled in the art without departing from the scope of the present invention as herein described with reference to the accompanying drawings.

What is claimed is:
1. A virtual token stored on non-transitory computer readable memory and representative of an item, said token comprising:
    a core data block comprising:
        an item data block, comprising:
            identification data which specifies said item the token represents,
            at least one operational rule defining how said item is to be used,
            at least one capability which applies to the value of said item, and
            at least one capability filter; and
        a lifecycle stage data block including capabilities filter data for adjusting said at least one capability and said at least one operational rule based on time or events; and a proxy data block for installation on a user computer device, said proxy data block comprising:
   identification data which specifies said item the token represents, and
   access instruction data for accessing said item data block.

2. A token as claimed in claim 1, wherein said identification data identifies an owner of the token.

3. A token as claimed in claim 2, wherein said token is part of a token hierarchy, and wherein the identification data identifies a position of said token in the hierarchy.

4. A token as claimed in claim 3, wherein said token is a primary token referring to at least one secondary token.

5. A token as claimed in claim 3, wherein said token is a secondary token referring to at least one primary token.

6. A token as claimed in claim 1, wherein said token is part of a token hierarchy defined by token cluster data accessible by said token.

7. A token as claimed in claim 6, wherein said cluster data includes data providing links to primary and secondary tokens of a token cluster.

8. A token as claimed in claim 2, wherein said identification data identifies a template used to create the token.

9. A token as claimed in claim 2, wherein said identification data identifies other virtual tokens referenced by the token.

10. A token as claimed in claim 1, further comprising instructions to send an access request to a location of a computer device, such as a computer system, application server or handheld device.

11. A token as claimed in claim 1, further comprising a connector data block having data for creating, managing or controlling said item, said connector data block being accessible based on a reference in said item data block.

12. A token as claimed in claim 1, wherein said item data block refers to a cluster data block defining said token's position in a hierarchy.

13. A virtual token as claimed in claim 1, wherein the computer device is adapted for connection to a communications network.

14. A virtual token as claimed in claim 1, wherein said computer device is portable.

* * * * *

UNITED STATES PATENT AND TRADEMARK OFFICE
CERTIFICATE OF CORRECTION

| | |
|---|---|
| PATENT NO. | : 8,037,193 B2 |
| APPLICATION NO. | : 10/169279 |
| DATED | : October 11, 2011 |
| INVENTOR(S) | : Hay et al. |

Page 1 of 1

It is certified that error appears in the above-identified patent and that said Letters Patent is hereby corrected as shown below:

In Column 2, Line 7, please delete "Web sites" and insert --Websites-- therefor.

In Column 2, Line 34, please delete "modem" and insert --modern-- therefor.

In Column 2, Line 34, please delete "modem" and insert --modern-- therefor.

In Column 4, Line 26, please delete "on going" and insert --ongoing-- therefor.

In Column 4, Line 63, please delete "eg" and insert --e.g.,-- therefor.

In Column 4, Line 64, please delete "eg" and insert --e.g.,-- therefor.

In Column 5, Lines 45-46, please delete "multi purpose" and insert --multipurpose-- therefor.

In Column 10, Line 15 (Approx.), please delete "exiting" and insert --existing-- therefor.

In Column 10, Line 63, please delete "eg" and insert --e.g.,-- therefor.

In Column 10, Line 64, please delete "eg" and insert --e.g.,-- therefor.

In Column 10, Line 66, please delete "eg" and insert --e.g.,-- therefor.

In Column 11, Line 1, please delete "eg" and insert --e.g.,-- therefor.

In Column 11, Lines 3-4, please delete "non existent" and insert --nonexistent-- therefor.

In Column 12, Line 62, please delete "(ie" and insert --(i.e.-- therefor.

In Column 17, Line 3, after "346", please insert --.--.

Signed and Sealed this
Twenty-seventh Day of March, 2012

David J. Kappos
*Director of the United States Patent and Trademark Office*